United States Patent
Lieberman et al.

(10) Patent No.: US 7,500,916 B2
(45) Date of Patent: Mar. 10, 2009

(54) GAME STRATEGY ANALYSIS TOOL GENERATING A TWO DIMENSIONAL IMAGE OVERLAID WITH TELEMETRY DATA

(75) Inventors: Aaron David Lieberman, Seattle, WA (US); Zachary Lewis Russell, Bellevue, WA (US); Luke Wilson Timmins, Sammamish, WA (US); Thomas George Gioconda, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/267,193

(22) Filed: Nov. 7, 2005

(65) Prior Publication Data

US 2008/0096663 A1   Apr. 24, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. .............. 463/31; 463/30; 463/42; 463/43

(58) Field of Classification Search .......... 463/4, 463/30, 31, 42, 43
See application file for complete search history.

(56) References Cited

U.S. PATENT DOCUMENTS

| | | | | |
|---|---|---|---|---|
| RE35,314 E | * | 8/1996 | Logg | 463/2 |
| 5,558,333 A | * | 9/1996 | Kelson et al. | 473/131 |
| 6,569,011 B1 | * | 5/2003 | Lynch et al. | 463/1 |
| 6,726,567 B1 | * | 4/2004 | Khosla | 463/42 |
| 6,959,182 B2 | * | 10/2005 | Lingafeldt et al. | 455/405 |
| 7,121,962 B2 | * | 10/2006 | Reeves | 473/407 |
| 7,265,663 B2 | * | 9/2007 | Steele | 340/531 |
| 2001/0003715 A1 | * | 6/2001 | Jutzi et al. | 463/40 |
| 2002/0138587 A1 | * | 9/2002 | Koehler et al. | 709/207 |
| 2002/0165630 A1 | * | 11/2002 | Arthur et al. | 700/91 |
| 2004/0143852 A1 | * | 7/2004 | Meyers | 725/133 |
| 2004/0162125 A1 | * | 8/2004 | Tarlie | 463/3 |
| 2007/0060359 A1 | * | 3/2007 | Smith | 463/42 |

OTHER PUBLICATIONS

Civilization IV, IGN.com (release date: Oct. 24, 2005), http://pc.ign.com/objects/620/620513.html.*
Civilization IV, IGN.com (screenshot), http://pc.ign.com/dor/pc/620513/images/civilization-iv-20051021033934097.html.*
SOCOM: U.S. Navy Seals, IGN.com (release data: Aug. 27, 2002), http://ps2.ign.com/objects/016/016371.html.*
SOCOM: U.S. Navy Seals, Zipper Interactive, User's Manual.*

* cited by examiner

*Primary Examiner*—Scott E Jones
*Assistant Examiner*—Milap Shah
(74) *Attorney, Agent, or Firm*—Workman Nydegger

(57) ABSTRACT

Methods and systems for recording and analyzing game session telemetry data are disclosed. A game console records telemetry data during a game session of a video game. The telemetry data may include location and time information for a player character performing various events in the video game. The telemetry data is sent to a title server corresponding to the video game, and the title server analyzes the data and stores the data in a database. A user, via a web site, can subsequently query the telemetry data stored in the database for user-specified criteria. A two-dimensional image of a view of the simulated environment within the video game is generated, overlaid with the location and time-based telemetry data, and is sent to the user for review and analysis.

14 Claims, 17 Drawing Sheets

GAME STRATEGY ANALYSIS TOOL GENERATING A TWO DIMENSIONAL IMAGE OVERLAID WITH TELEMETRY DATA

BACKGROUND

Computer and video games have matured from the likes of "Pong" into epic adventures having rich storylines, photorealistic graphics, and complex interaction systems, thereby allowing a player to immerse herself in the alternative reality that is emulated by the video game. The term video or computer game typically refers to any game played on a data processing device. Examples of video games may include computer games, game console games (e.g., playable on the XBOX®, PLAYSTATION®, and/or NINTENDO® brand game consoles), coin-operated or token-operated arcade games, portable gaming device games (e.g., playable on the Nokia N-GAGE®, PLAYSTATION PORTABLE®, NINTENDO DS®, Gizmondo, mobile phone, etc.), or other software-driven games. A video or computer game may refer to any software driven application that provides a graphically depicted virtual environment, and having one or more objectives that one or more characters attempt to complete within the virtual environment under a set of predetermined constraints or rules. Each character controlled by a player/user may be referred to as a player-character (PC); each computer controlled character may be referred to as a non-player-character (NPC).

Video games can be divided into many genres, such as first-person shooters (FPS), role-playing games (RPG), simulation, sports, strategy, action and driving, to name a few. Each video game is not necessarily limited to a single genre, and may indeed encompass multiple genres. For example, an RPG generally refers to a game in which each participant assumes the role of a character in the game (such as a soldier, adventurer, monster, or other player-character) that can interact within the game's virtual world. RPGs are generally presented in third person perspective, i.e., the display screen provides a viewpoint as if the player is observing/interacting with the game from a point other than the player character's viewpoint. However, some RPGs are presented in first-person perspective.

Another genre of video games is referred to as the first-person shooter (FPS) genre. The display screen for FPS games typically provides a first person point of view, e.g., as if the player is viewing the video game's virtual world through the eyes of the character the player is controlling. Popular FPS games include the HALO®, DOOM®, QUAKE®, DUKE NUKEM™, and Half-Life® franchises. FPS games are very popular, in part because they are particularly well suited to multiplayer game play. In multiplayer play, each participant controls a player-character within the virtual environment, and the participants either work alone or in teams to complete their objective(s) for a particular game. Multiplayer FPS games may provide different objectives in various game modes, thus providing a variety of game play types to participants. Some known multiplayer game modes include every-man-for-himself, every-team-for-himself, capture the flag, assault, and king of the hill. Every-man-for-himself format, referred to in the HALO® franchise as Slayer mode, and referred to in the QUAKE® franchise as Deathmatch mode, refers to a multiplayer game where each participant tries to kill all other participants in the graphically simulated virtual environment, e.g., within a specific period of time, a specific number of times, etc. Every-team-for-itself refers to a multiplayer game where groups of participants attempt to kill competing groups of participants in the graphically simulated virtual environment. In capture the flag, the video game simulates a flag in the virtual environment, and teams compete to capture the flag from an initial position and return the flag to a home base of the capturing team. In the assault game mode, teams attempt to penetrate a home base of competing teams and plant a bomb or flag in the competing team's base. Finally, in king of the hill, players or teams attempt to control a specific location for a preset period of time. The first player or team to control the specific location for that preset period of time wins. Each of the above game modes may have various modifications and settings that can be customized from one game to the next.

Regardless of the game mode players naturally progress in skill, some faster than others, and certain players become very skilled at particular FPS games and game types. Other less-skilled players subsequently might have a difficult time developing skills as a result of being easily beaten by the more skilled players. While some games may provide post-game summary statistics, e.g., number of kills, number of times killed, special accomplishments, etc., games do not presently provide sufficient post-game analysis of how players accomplish feats, thereby giving less skilled players an opportunity to research tactics of more advanced players. Thus, it would be an advance in the art to provide a post-game analysis of how players accomplished one or more objectives, including where players were located to accomplish objectives, routes taken steal the flag or plant the bomb, and similar strategic information.

SUMMARY

The following presents a simplified summary in order to provide a basic understanding of some aspects described herein. This summary is not an extensive overview of the features herein. It is not intended to identify key or critical elements, or to delineate the scope of this application. The following summary merely presents some concepts in a simplified form as a prelude to the more detailed description provided below.

Thus, an aspect is directed to one or more computer-readable media storing computer-executable instructions that, when executed, perform a method in a title server for analyzing telemetry data recorded during a game session of a video game. The video game includes a simulated environment in which the game is played, and the telemetry data includes information corresponding to one or more events occurring within the simulated environment. Game session telemetry data corresponding to a first player-character is received from a game playing device. The first player-character is controlled by a user of the game playing device. The game session telemetry data is stored in a database for subsequent querying by a user. Based on the user query, a two dimensional image is generated, where the two dimensional image depicts a first view of the simulated environment overlaid with the queried telemetry data. The overlaid telemetry data is placed in the two dimensional image at an approximate location of each event to which the overlaid telemetry data corresponds.

According to another aspect, one or more game playing devices may record telemetry data during a game session of a video game. The video game includes a simulated environment in which the game is played. Each time one of a predefined set of events occurs within the game session, the game playing device stores telemetry data comprising a location within the simulated environment of a player character performing the predefined event, a time at which the predefined event occurred within the game session, and an identification of the player character. Upon completion of the game session, the game playing device uploads the stored telemetry data to a title server corresponding to the video game.

According to yet another aspect, telemetry data may be used to detect cheaters playing a video game in an online gaming network. The video game may include a simulated environment in which the game is played. A title server receives from a game playing device, game session telemetry data corresponding to a player-character. The player-character is controlled by a user of the game playing device. The game session telemetry data includes location information over time, each location corresponding to one or more events occurring during the game session. The tide server stores the game session telemetry data in a database, and then compares the stored game session telemetry data against the physics of a game engine of the video game. When the stored game session telemetry data is adverse to the physics of the game engine, the title server determines that a user corresponding to the telemetry data is a cheater.

BRIEF DESCRIPTION OF THE DRAWINGS

A more complete understanding of the various features and advantages thereof may be acquired by referring to the following description in consideration of the accompanying drawings, in which like reference numbers indicate like features, and wherein.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

Figure 1:
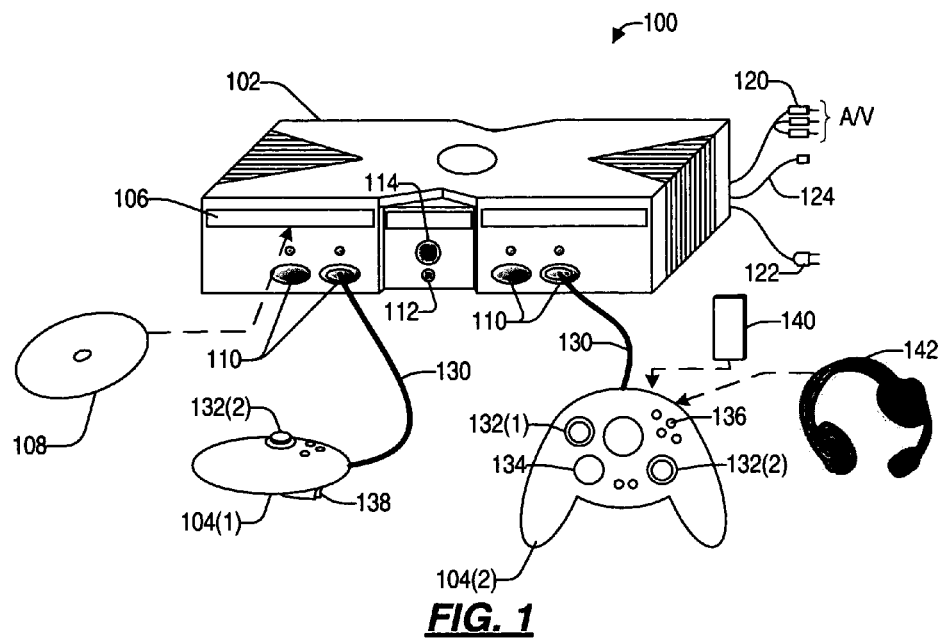
FIG. 1 illustrates a gaming system that may be used according to an illustrative embodiment.

FIG. 1 illustrates an example of a suitable gaming system environment 100 on which computer games, video games, and or other electronic games (collectively referred to herein as computer or video games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and one or more handheld controllers, as represented by controllers 104(1) and 104(2). The game console 102 may be equipped with an internal or external hard disk drive and a portable media drive 106 that supports various forms of portable storage media as represented by optical storage disc 108. Examples of suitable portable storage media include DVD, CD-ROM, game discs, and so forth.

Game console 102 may have a number of slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet. Connector 124 may also be fitted with a wireless adapter to connect to one or more wireless networks.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 may be equipped with two thumbsticks 132(1) and 132(2), a D-pad 134, buttons 136 (e.g., 'A', 'B', 'X', 'Y'), and two triggers 138. The thumbsticks 132 may be analog directional control units, and may include analog potentiometers to detect a degree of position in the X- and Y- coordinates. D-pad 134 may be a directional pad, with inputs for entering directional commands such as up, down, left and right, or combinations of these directions (e.g., upper-left). D-pad 134 may also be analog, and may provide input as to a degree of pressure used to press in a particular direction. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., "WINDOWS™" Media Audio (WMA) format), or from online streaming sources; and digital audio/video played from a DVD disc in the portable media drive 106, from a file on the hard disk drive (e.g., Active Streaming Format), or from online streaming sources.

Figure 2:
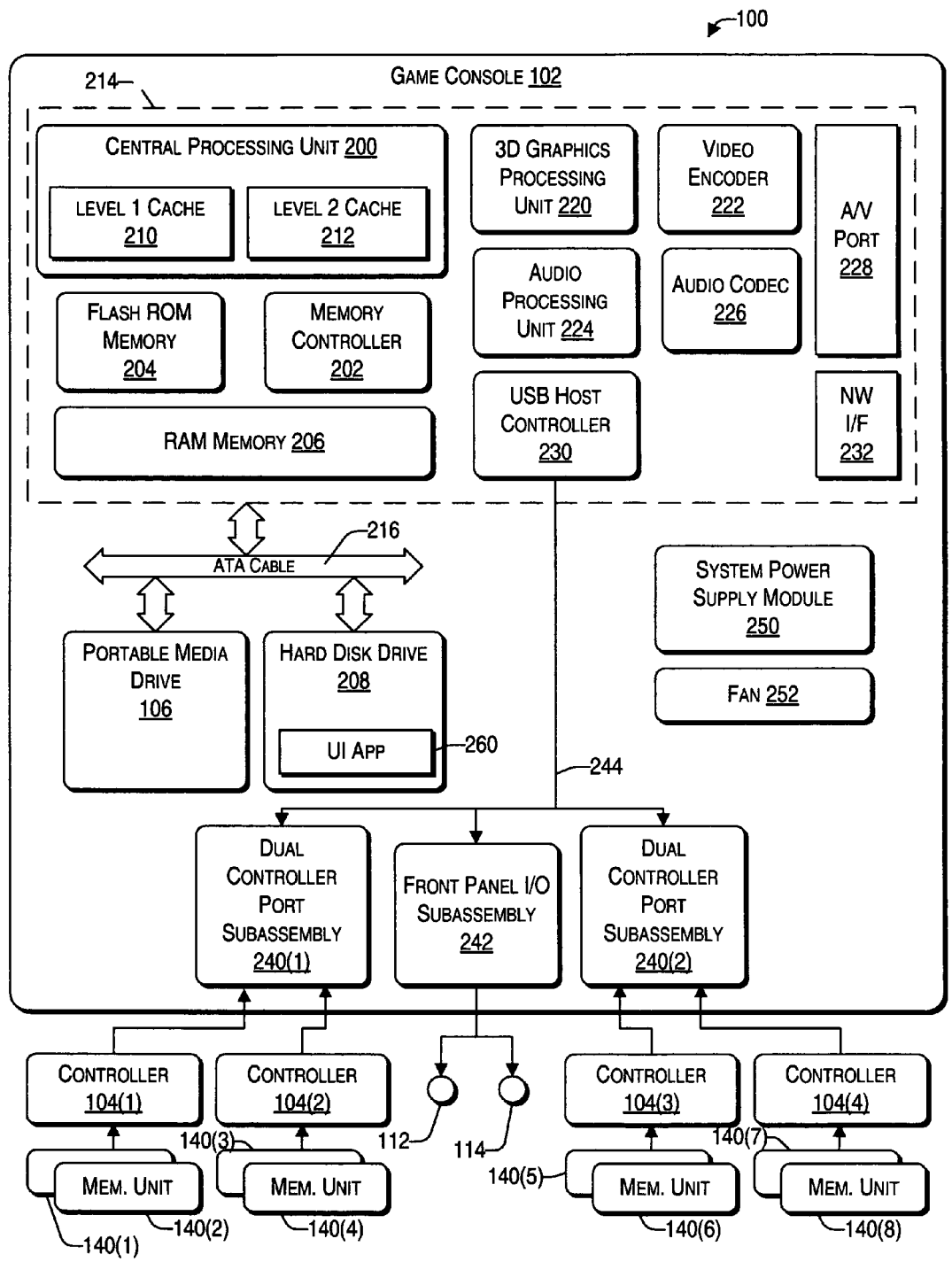
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
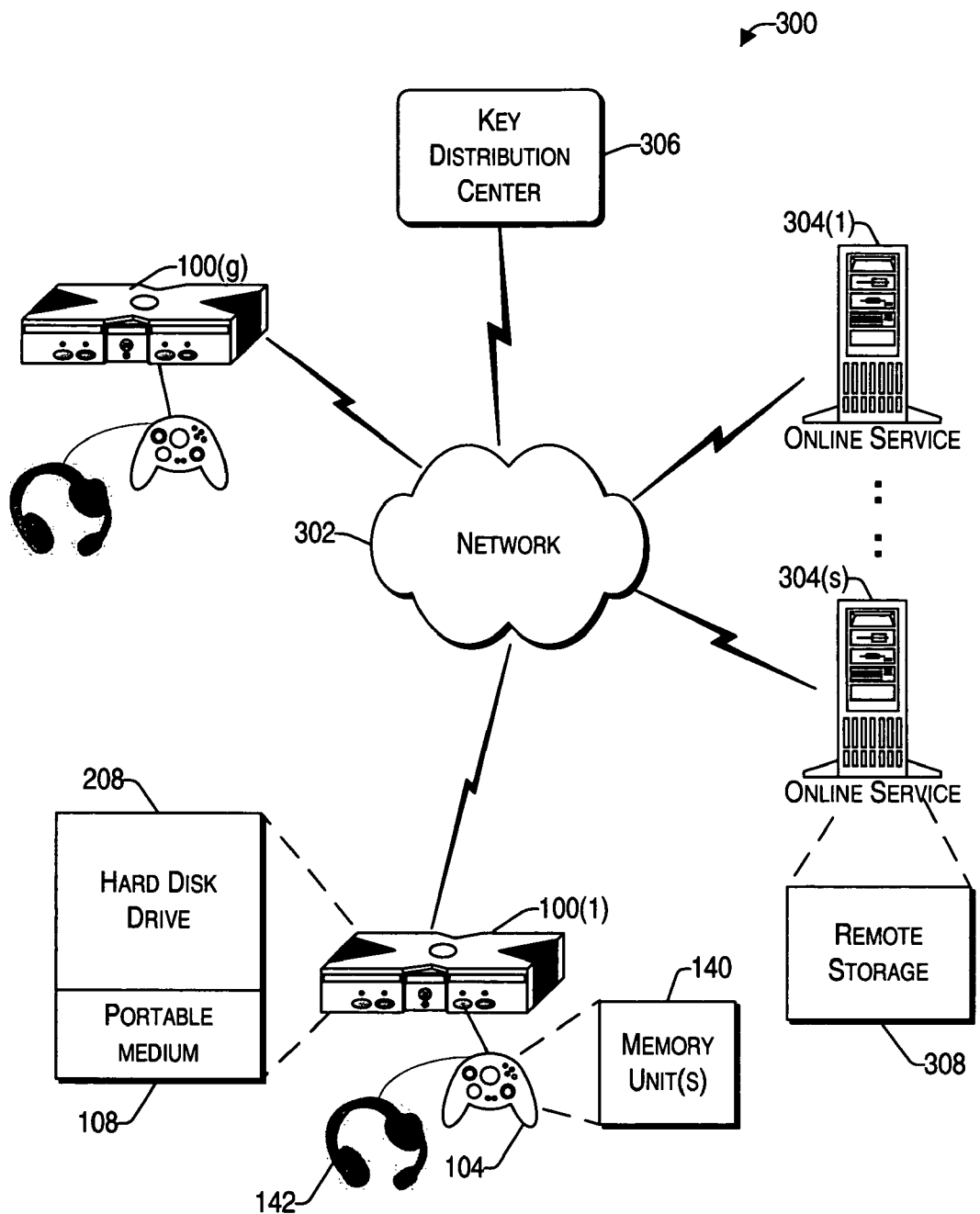
FIG. 3 illustrates a block diagram of a network gaming system according to an illustrative aspect.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
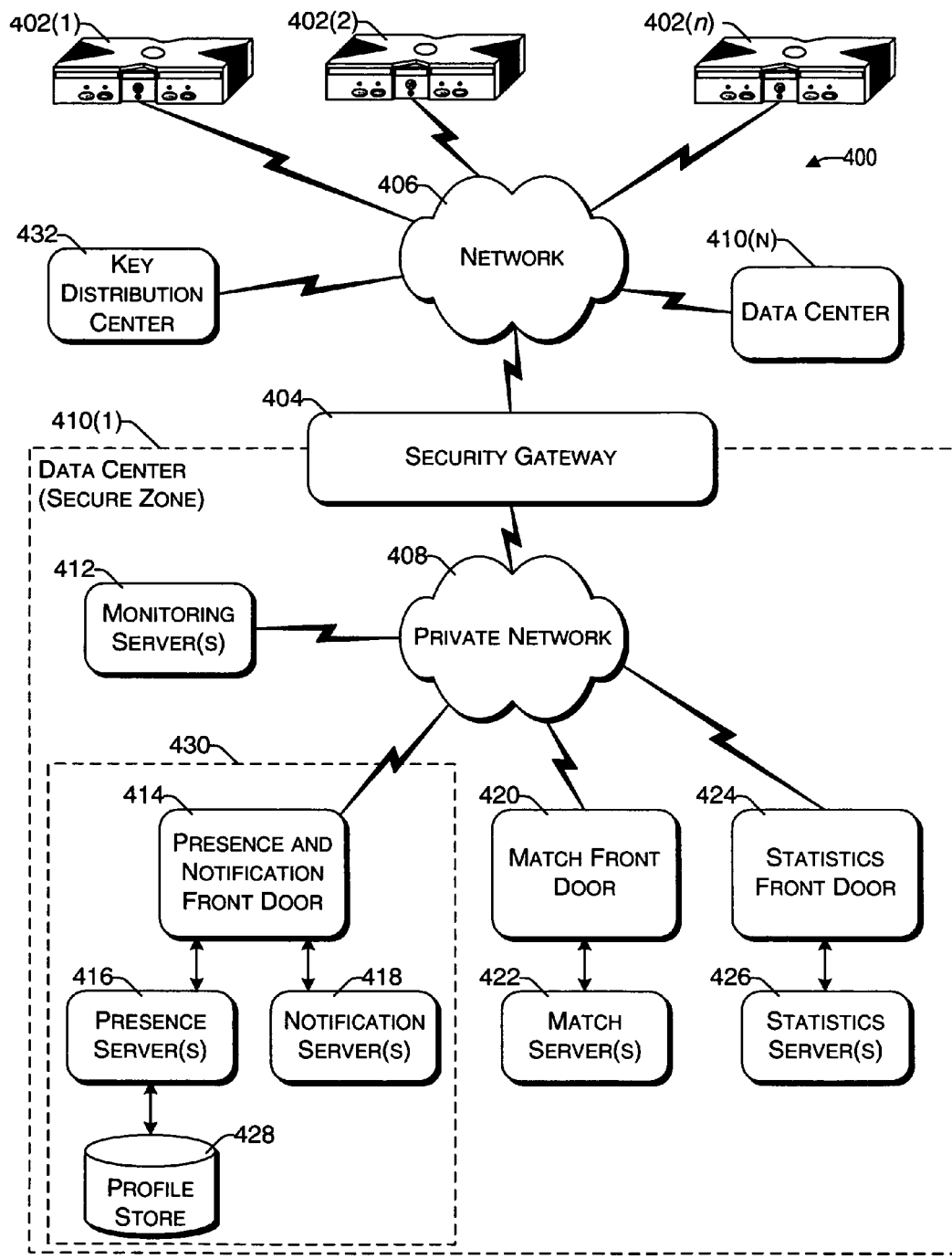
FIG. 4 illustrates another block diagram of an online gaming environment according to an illustrative aspect.

FIG. 4 is a block diagram of another illustrative online gaming environment 400, e.g. "XBOX™ LIVE™" by Microsoft Corporation of Redmond, Wash. Multiple game consoles 402(1), 402(2), . . . , 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102, 402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 432 and obtains, from key distribution center 432, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

FIG. 4 illustrates a single data center 410(1) in detail. However, multiple data centers 410(1) ... 410(n) may be used. For example, a first data center 410(1) may be used to manage an online gaming network such as XBOX® LIVE, while another data center may be used to manage similar functions for a specific game title, e.g., HALO® 2. A data center specific to a game title may be alternatively referred to as a title server. A game console may obtain an address, e.g., an IP address, of a title server from key distribution center 432 upon authentication and identification of the game title presently being played on the game console.

One or more features described herein may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 208, removable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
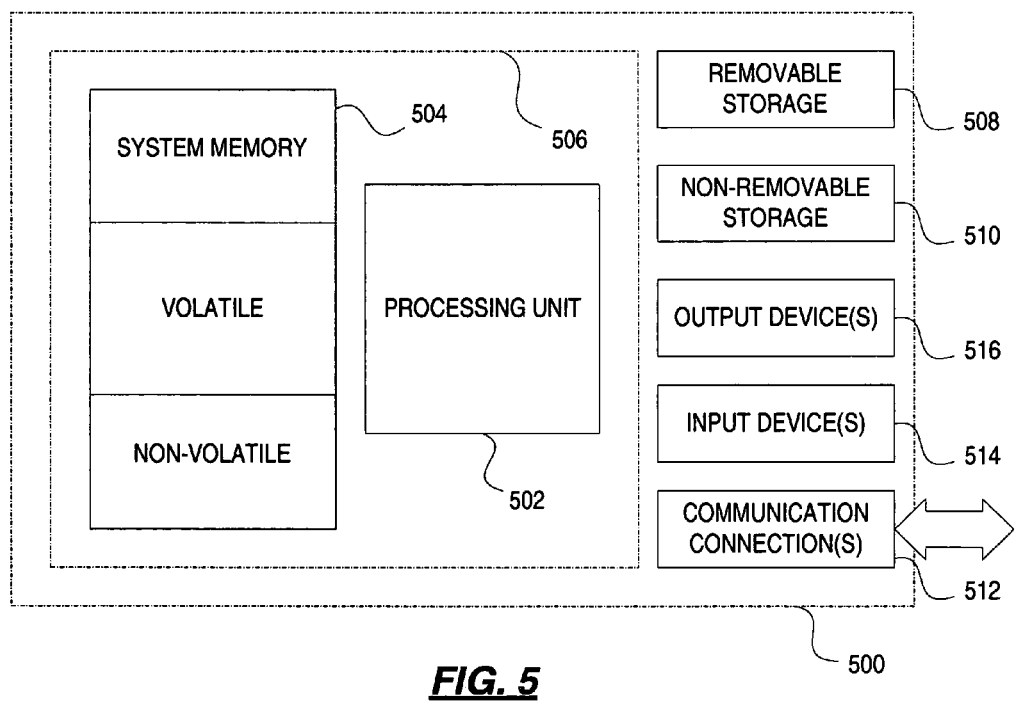
FIG. 5 illustrates a block diagram of a general purpose data processing device that may be used according to one or more illustrative aspects.

Aspects herein are not limited to console computing environments. Indeed, these aspects may also be implemented in video games that operate on personal computers (PC). FIG. 5 illustrates an example of a suitable computing system environment 500 on which the features described herein may be implemented. The computing system environment 500 is only one example of a suitable computing environment and is not intended to suggest any limitation as to the scope of use or functionality of the features described herein. Neither should the computing environment 500 be interpreted as having any dependency or requirement relating to any one or combination of components illustrated in the exemplary operating environment 500.

The features herein are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features herein may be described in the general context of computer-executable instructions, such as program modules, being executed by a computer. Generally, program modules include routines, programs, objects, components, data structures, etc., that perform particular tasks or implement particular abstract data types. The features may also be practiced in distributed computing environments where tasks are performed by remote processing devices that are linked through a communications network. In a distributed computing environment, program modules may be located in both local and remote computer storage media including memory storage devices.

In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data instructing a device to operate as described herein. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD)

or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer 500 may include a variety of computer readable media. Computer readable media can be any available media that can be accessed by computer 500 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices (in the singular or the plural), or any other medium which can be used to store the desired information and which can accessed by computer 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Device 500 may also have input device(s) 514 such as keyboard, mouse, pen, voice input device, touch input device, etc. Output device(s) 516 such as a display, speakers, printer, etc., may also be included. All these devices are well known in the art and need not be discussed at length here.

Illustrative Embodiments

Aspects described herein collect in-game telemetry data from one or more game consoles (or other game playing hardware) during a single- or multiplayer game session in order to analyze the game data and present the game data to one or more user(s) for review after the game session is over. The user's review of the saved game data may be via a same or different network. For example, according to an illustrative feature, a user can subsequently review XBOX® LIVE game strategy via the Internet. For illustrative purposes, various features are described herein with respect to networked multiplayer HALO® 2 games being played on an XBOX® game console. Those of skill in the art will appreciate that the aspects and features described herein are illustrative in nature, and may be similarly implemented with respect to other game titles, game devices, game networks, etc.

Figure 6:
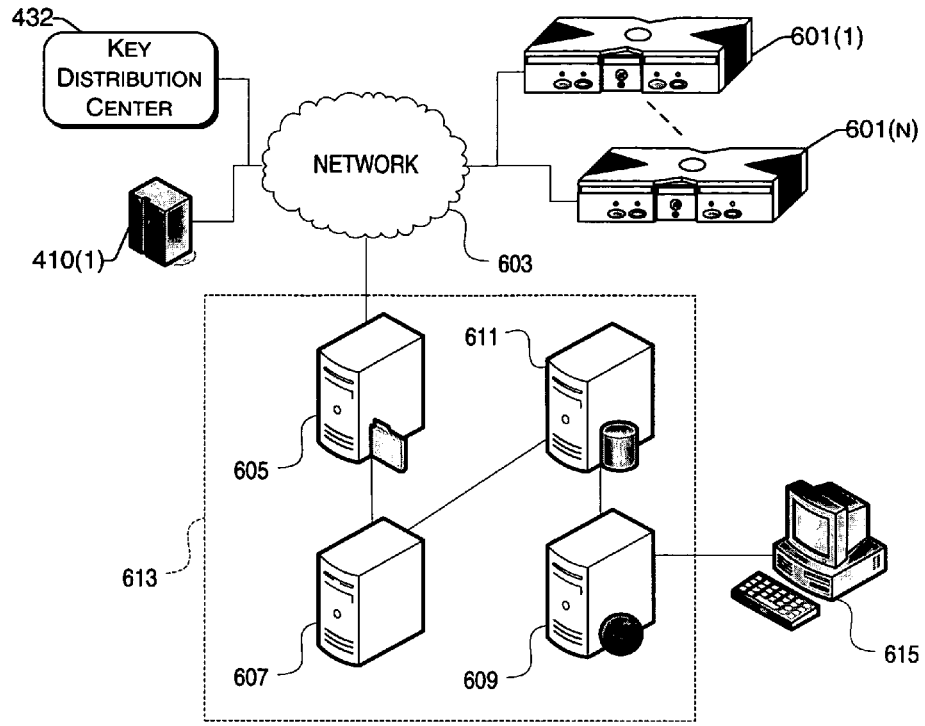
FIG. 6 illustrates a network architecture that may be used according to one or more illustrative aspects.

With reference to FIG. 6, one or more game consoles 601(1) . . . 601(n) may be connected via a network 603 (e.g., the Internet) to an online gaming system administered by key distribution center 432 and data center 410(1). Upon authentication and identification of a game title executing in console 601, key distribution center 432 may provide the game console 601 an address (e.g., IP address) of a corresponding title server 613. In addition to providing matching, notification and presence services (not shown), title server 613 may also include an upload server 605 for receiving game session telemetry data from game consoles 601(1) . . . 601(n) during games or after games have concluded. Game session telemetry data will be described in more detail below. The title server 613 may also include a processing server 607 to parse and organize the uploaded game session telemetry data and store the parsed and organized game session telemetry data in a database 611. An included web server 609 queries database 611 for game strategy data requested by a user browsing the Internet using computer 615. While the elements of title server 613 are shown separately for illustrative purposes, those of skill in the art will appreciate that elements of a title server are logical elements, and the functionality may be combined into common servers, or distributed among various devices as desired.

Figure 7:
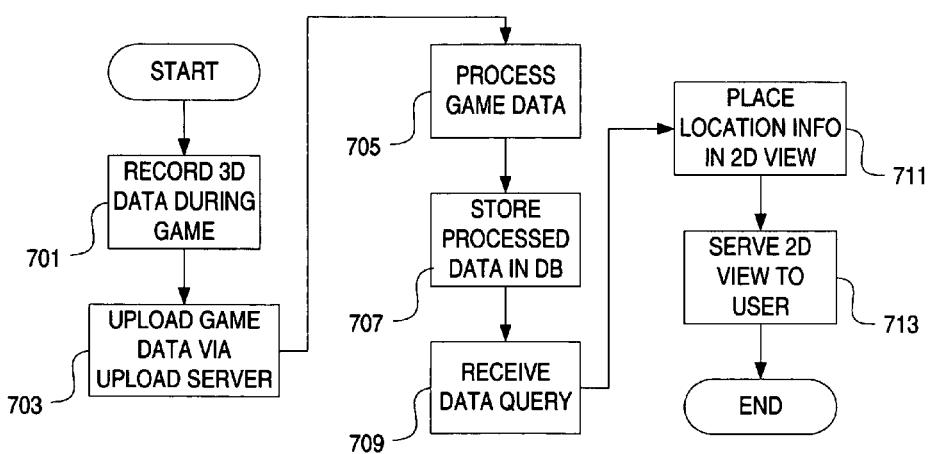
FIG. 7 illustrates a method for creating a post-game analysis image according to one or more illustrative aspects.

With further reference to FIG. 7, in order to present post-game strategy data to users, various information may be recorded during games, uploaded to the title server, processed into usable form, and presented to users via a web site or other data service. Initially, in step 701, specific information is recorded during each game session, the information being referred to herein as game session telemetry data. The game session telemetry data may generally include any type of statistical information concerning a player's performance during a game session, and may include for example a number of kills by each player, assists, deaths, suicides, medals or achievements accomplished during the game by each player, types of kills or special feats accomplished, average lifespan, best killing spree, score, shots fired, shots hit, head shots, and similar statistical information. When a player character kills another player character, the game console may record both the killer's and the victim's identity. In addition, because multiple game consoles are engaged in a single multiplayer game, each game console need not record redundant information being recorded by other game consoles. Thus, one game console per game session might be selected to record the desired information. Alternatively, each game console might record information pertaining to the player character being controlled by the user playing on that game console. The game session telemetry data selected to be recorded may depend on the type of game being played, and may provide more than mere statistics. For example, the data may include an indication of how a player achieves an objective, e.g., by recording the player's location at various times or during various in-game events.

According to an illustrative aspect, during a Slayer type game in HALO® 2, each game console might record a timestamp and location of the player-character corresponding to that game console when that player character kills another player-character or is killed by another player character. The location data may be in any format that identifies a particular location in the virtual environment of the computer game, including enough information to identify a location in a virtual three-dimensional space if used by the game title (e.g., three-dimensional Cartesian coordinates, identification of predefined map areas, etc.). The timestamp data may identify the time during the game session when the player is at that location. The telemetry data may also record data surrounding predefined events in a game, such as the killing of a player character. When the player character kills another player-character, the game console may also record an identification of the killed player character, the killing player character, the weapon used, the type of kill, conditions of the players at the time, etc.

During a capture the flag type game, game session telemetry data may further include, for every second (or some other predetermined period of time), a location of the player character corresponding to that game console while that player character is carrying the flag. The game console may also record when the player character corresponding to that game console kills a player character carrying the flag. Similarly, during an assault type game, each game console may additionally record, every second (or some other predetermined period of time), a location of the player character corresponding to that game console if that player character is carrying the bomb. The game console may also record when the player character corresponding to that game console kills a player character carrying the bomb. In other objective-based games, the game console may record when a player character is carrying any non-weapon object or device.

Figure 8A:
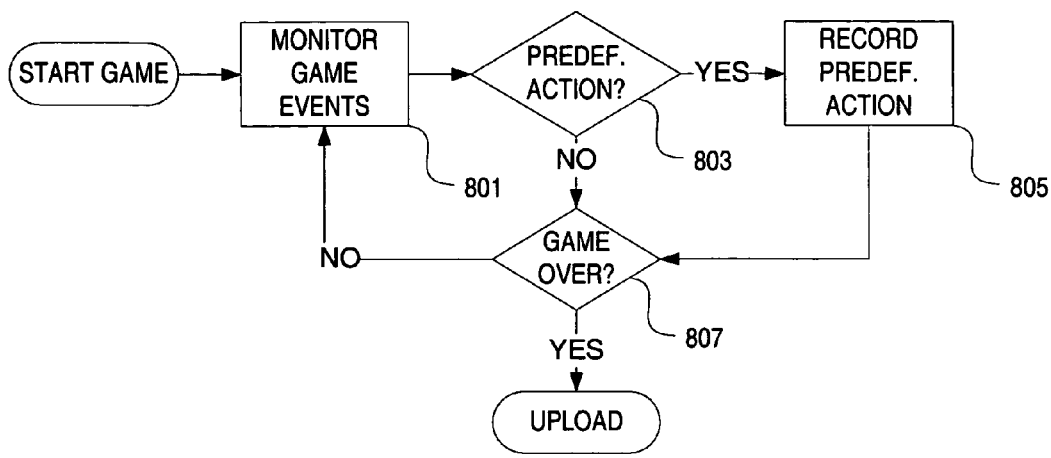
FIG. 8A illustrates a method of recording game data according to an illustrative aspect.

FIG. 8A illustrates a first method that may be used to record game session telemetry data in step 701. According to the method of FIG. 8A, in steps 801-803 each game console monitors game events and waits for a predetermined event to occur. When the predetermined event occurs, in step 805 the game console records at least timestamp and location data for the predefined event. If the predefined event is a kill, then killer and victim IDs may also be recorded. In step 807 the game console checks to see if the game is over, i.e., the predetermined event was the game ending. If the game is over, the game console uploads the recorded data to the upload server 605. The predetermined events for which the game console records data may include, e.g., game over, the player character corresponding to that game console killing another player character, the player character corresponding to that game console getting killed by another player character, the player character corresponding to that game console carrying an objective item (e.g., flag, bomb, etc.) or performing an objective action (e.g., returning flag to home base, planting bomb in enemy base, etc.).

Figure 8B:
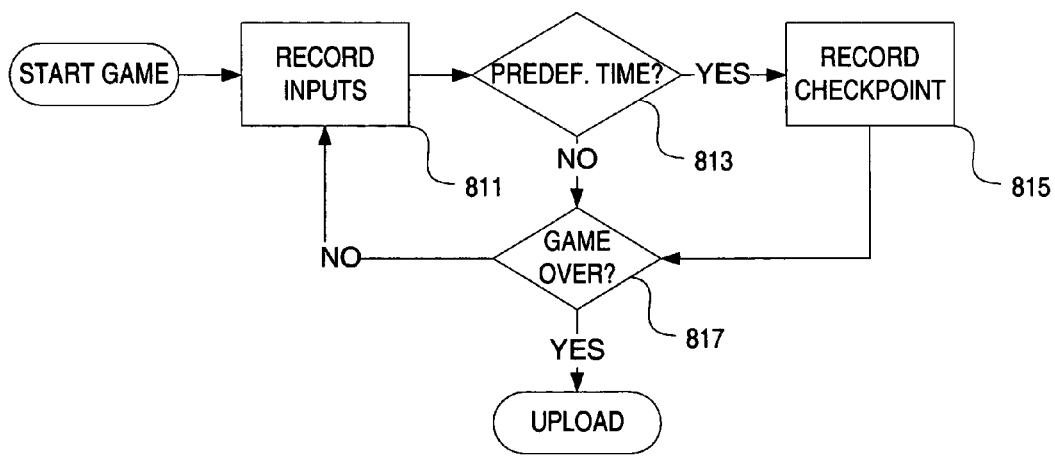
FIG. 8B illustrates another method of recording game data according to an illustrative aspect.

FIG. 8B illustrates an alternative method that may be used to record game session telemetry data in step 701. According to the method of FIG. 8B, upon the start of the game each game console notes an initial state of the game (e.g., including a location of each player character or just the player character corresponding to that game console), and each game console proceeds to record inputs received from the user playing the game on that game console. Each game console also records the times at which each input is received. Steps 813-815 serve to perform a checkpoint recording function. That is, in step 813 the game console checks to see if a predetermined amount of time has passed, e.g., ten (10) seconds. If so, the game console in step 815 records a checkpoint, which may include all game state data at that instant. If the game is not yet over, as determined in step 817, the game console returns to step 811 to continue recording input events and their respective times. When the game is over the game console uploads the generated data file, referred to as a saved film, to upload server 605. A saved film does not explicitly record events during the game, but instead records sequences of inputs which can be used to recreate an entire game by replaying the game based on the recorded inputs for each player. When the game is recreated, specific events can then be analyzed and pulled from the replay, and stored as desired to identify and record the predetermined actions as noted above with respect to FIG. 8A.

Referring back to FIG. 7, at the end of each game, in step 703, each game console uploads the recorded game session telemetry data to upload server 605, which passes the uploaded game session telemetry data to process server 607. Alternatively, each game console in a game session may provide the game session telemetry data to a single game console from the recently ended game session, and that game console may coordinate uploading of all recorded game session telemetry data to the upload server. In addition to game session telemetry data, the uploaded data may also be referred to as the post-game carnage report (PCR).

Figure 9:
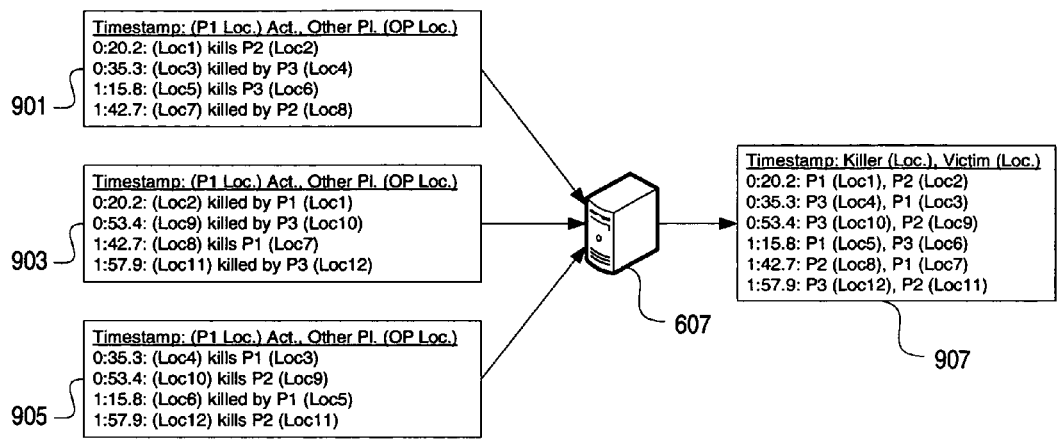
FIG. 9 illustrates data flow and processing performed by a process server according to an illustrative aspect.

Upon receiving the game session telemetry data, in step 705 the process server 607 analyzes the game session telemetry data and combines the game session telemetry data from each game console into a single game session file, removing redundancy where possible. For example, each kill may be reported twice, once by the player character performing the kill, and once by the player character that was killed. Thus, the process server 607 matches the reported pairs and records the kill in a single entry in the game session file. FIG. 9 conceptually illustrates redundancy removal performed by process server 607 after receiving recorded game data from three game consoles participating in a three-player two-minute Slayer type multiplayer game. In FIG. 9, process server 607 receives three game session telemetry data files 901, 903, 905, one from each participating game console, corresponding to player 1 (P1), player 2 (P2), and player 3 (P3), respectively. Process server 607 analyzes the data files, confirms that all data appears accurate (e.g., timestamps and kills match—player 3 should not report an extra kill when neither player 1 nor player 2 report having been killed that extra time), and outputs the processed data 907. Processed data 907 includes, for example, a timestamp of an event, and the event data. Here, the event data includes an identification of a player character that killed another player character, the location of the killing player character at the indicated time, an identification of the killed (victim) player character, and the location of the killed player character at the indicated time. The single game session file 907 may further include objective data, e.g., bomb or flag carrying information, when the multiplayer game type so provides.

While a single game session file is illustrated herein, the game session telemetry data need not ever actually be stored in a single file, but rather may be stored in multiple files or directly stored in database 611. Alternatively, database server 611 may store each game session as a stream of data corresponding to a game session, e.g., where queries are expected to be based on game sessions. In a system where queries may be based on user, map, weapon, or some other criteria, the game session telemetry data may be indexed by additional or other fields instead of by game session. For example, data may be indexed by map or by user to make queries based on map or user more efficient.

Referring back to FIG. 7, in step 707 the process server 607 stores the processed game session telemetry data 807 in database server 611, and the method then waits until a user submits a query in step 709. The query may be transmitted as a web services request, and may originate through a web server such as web server 609. Web server 609 may host a web site (FIGS. 11-20, described below) through which a user can navigate to receive and review post-game statistics, strategy, and analysis. The user query may identify a game session for which strategy analysis is desired. The game session may identify a map or virtual environment in which the identified game session was played, which is used to depict the post game analysis. Other query data may optionally be provided, e.g., a location or perspective from which the game analysis should be graphically depicted, and/or a user ID corresponding to one of the players that participated in the queried game session. If no location or perspective is provided, a default may be used.

In step 711, based on the received query, the database server 611 returns the stream of data corresponding to queried game session, and web server 609 analyzes the data for the identified game session and places the location information in a two-dimensional view selected for display to the user. The two-dimensional view may be based on the location or perspective selected by the user, or may be a default or predetermined location or perspective. Once the location information is placed within the two-dimensional view, the web server 609 serves the graphic to the user in step 713 for display on the user's computer 615, e.g., in a web browser application window.

Figure 10:
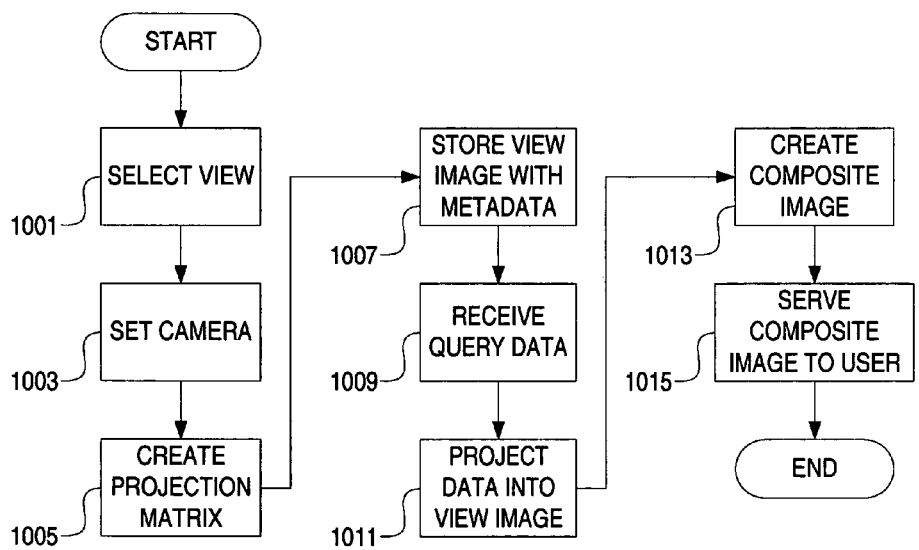
FIG. 10 illustrates a method for converting three-dimensional data to a two-dimensional view according to an illustrative aspect.

FIG. 10 illustrates a sample method through which database server 611 and/or web server 609 may convert the recorded three dimensional location information into two-dimensional position information on a two-dimensional image. In step 1001 a game developer, administrator of title server 613, a player, or some other individual selects a view from which post-game analysis should be provided. The view may be selected based on a specific location in the virtual environment depicted within the view, based on strategic importance of a location within the view, or any other criteria. Step 1003 sets a camera location, view, and orientation within the virtual environment based on the desired view. In step 1005 a projection matrix for the view is created, and in step 1007 a 2-dimensional image of the view based on the camera location and the projection matrix is composited. The database server 611 or web server 609 stores the two-dimensional image with corresponding metadata whereby three-dimensional points can later be inserted or drawn into the two-dimensional image.

At some later time, in step 1009 database server 611 receives a query from a user for strategic analysis of a selected game session. As a result, in step 1011 the database server 611, using the stored metadata, calculates where the queried location information is located within the two-dimensional view, and in step 1013 the database server 611 saves a composite image of the selected view with the location information for the queried game session overlaid on the image. Finally, in instep 1015, the database server sends the composite image to the web server 609 for further delivery to the user. Those of skill in the art will appreciate that each step of FIG. 10 may be performed at any time, provided steps 1001-1007 are performed prior to steps 1011-1015. Where a system is capable of rendering screenshots in real-time (e.g., using saved films and/or a farm of game consoles dedicated to this purpose), a user may specify details about the screenshot she would like to see or have the screenshot itself generated from the saved film and aggregate data.

Those of skill in the art will appreciate that variations and modifications to the method of FIG. 10 may be created and/or performed. For example, according to an illustrative aspect, a developer in step 1001 may manually navigate a game level or map with a debug camera and pick locations in step 1003 which would provide interesting points of view for various locations on the map during a game. The developer in step 1005 may run a command or execute a utility which takes a screenshot, stores depth information (z-buffer), and the camera information and saves it into a package in step 1007. The relevant camera information may include the world to view matrix, the projection matrix, the viewport bounds and the far clipping distance, among other information. With this information, a world point can be projected into 2D screen space in step 1011 by multiplying the world point by the world to view matrix to get the world point into camera space and then by the projection matrix to transform the world point into screen space. The system may scale and translate the resulting point to get the resulting point into the viewport and then scale and translate the resulting point into image space using viewport bounds.

The system in step 1013 may draw or render each point in image space using a 2D method and overlay it over the source image. Additionally, the depth information (z-buffer) can be used to determine if a point is obscured or behind visible geometry. If an item is so obscured it may be displayed in a different way, such as with a dotted line or different color.

FIGS. 11-20 illustrate screenshots of web site pages that may be used to allow a user to navigate for and review requested post-game strategy information. After optionally logging in to the web site or otherwise identifying him- or herself, the web server 609 may display a PlayerStats screen 1101 to the user, on which a selectable tab 1102 displays a list of games 1103 selectable by the user for review and analysis. Tab 1102 may display basic information regarding each game, e.g., a game type, date/time, map name, and the player's final position at the end of the game (e.g., $1^{st}$, $2^{nd}$, $3^{rd}$, etc.).

Figure 12:
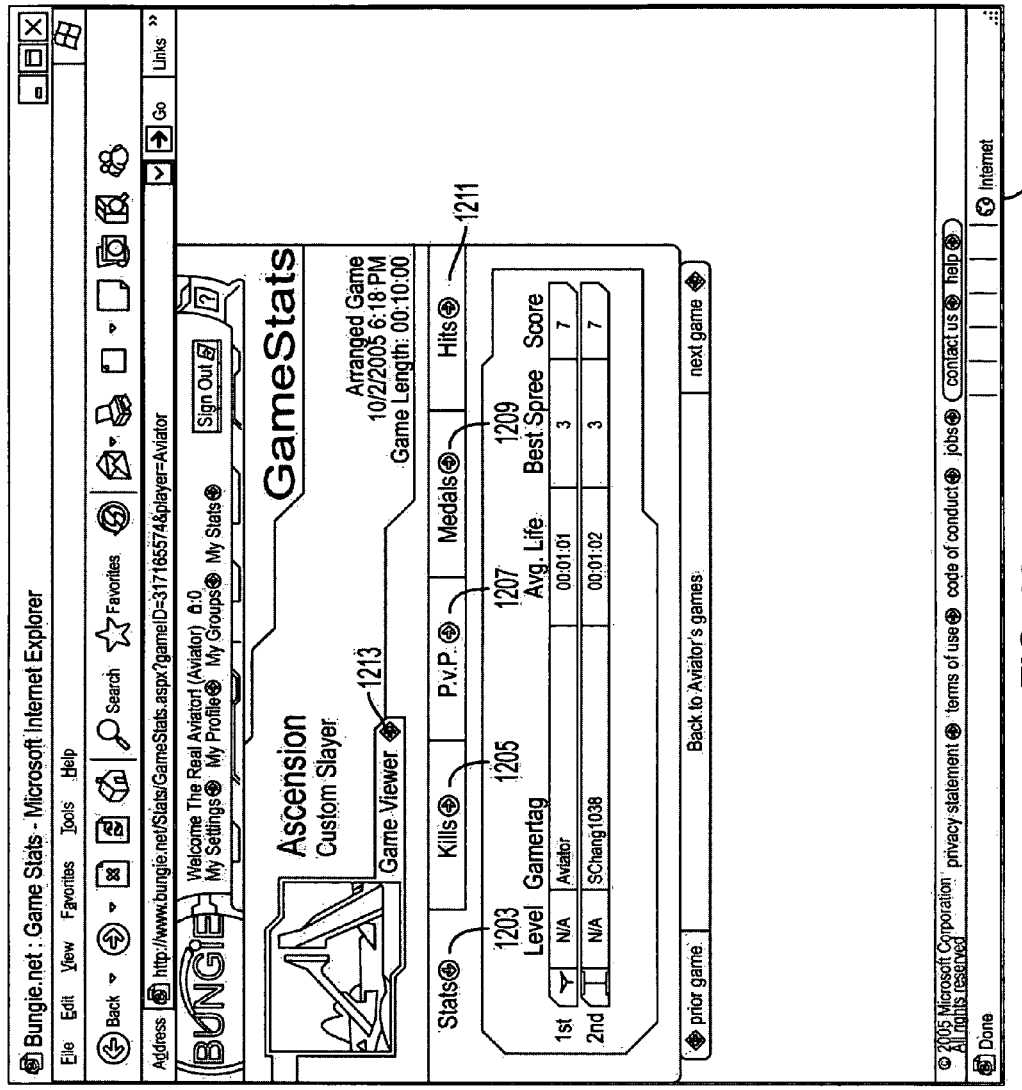
FIG. 12 illustrates a screenshot of a Stats tab of a GameStats screen according to an illustrative aspect.
Figure 13:
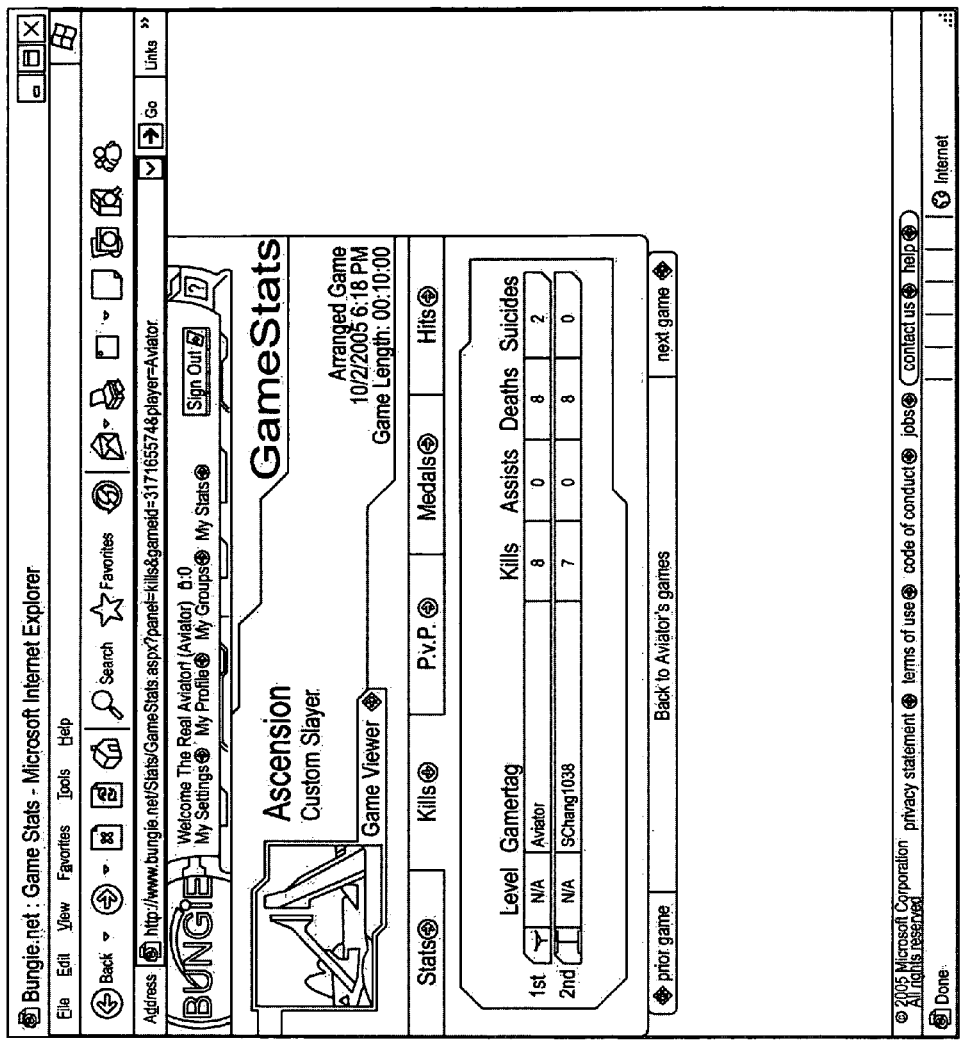
FIG. 13 illustrates a screenshot of a Kills tab of a GameStats screen according to an illustrative aspect.
Figure 14:
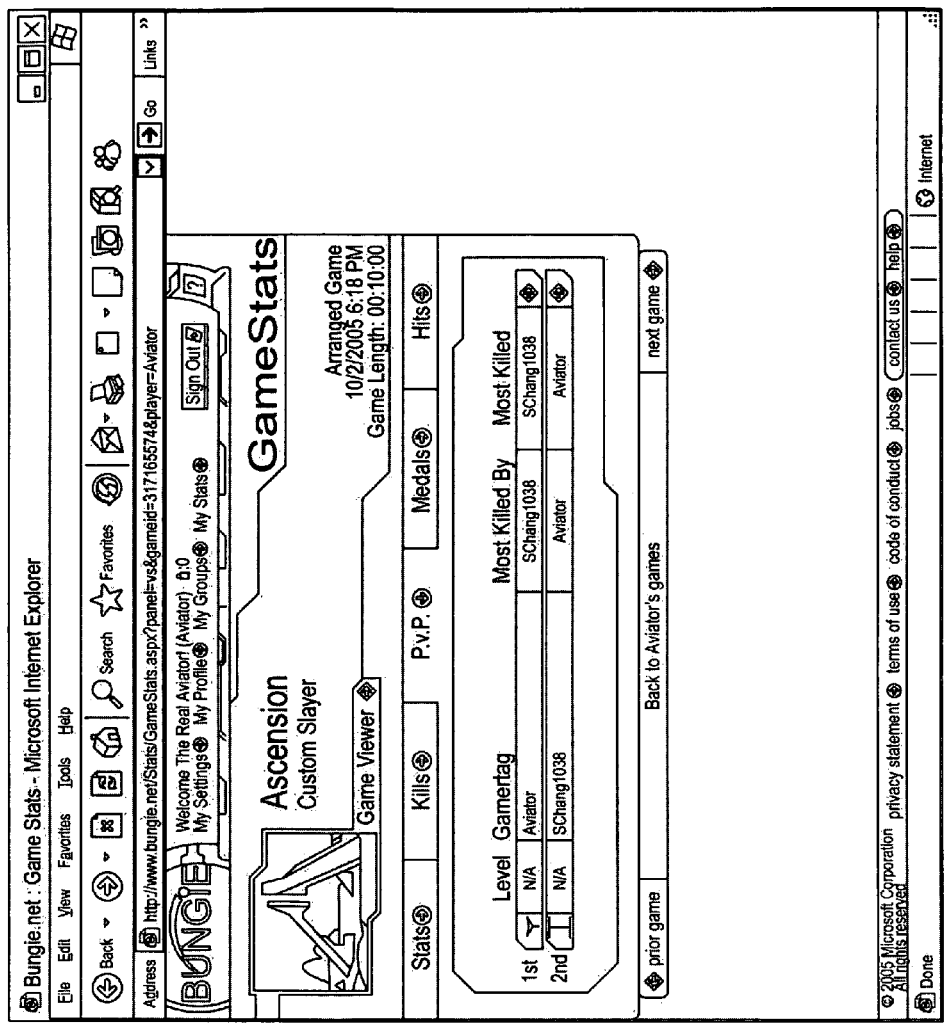
FIG. 14 illustrates a screenshot of a P.v.P. tab of a GameStats screen according to an illustrative aspect.
Figure 15:
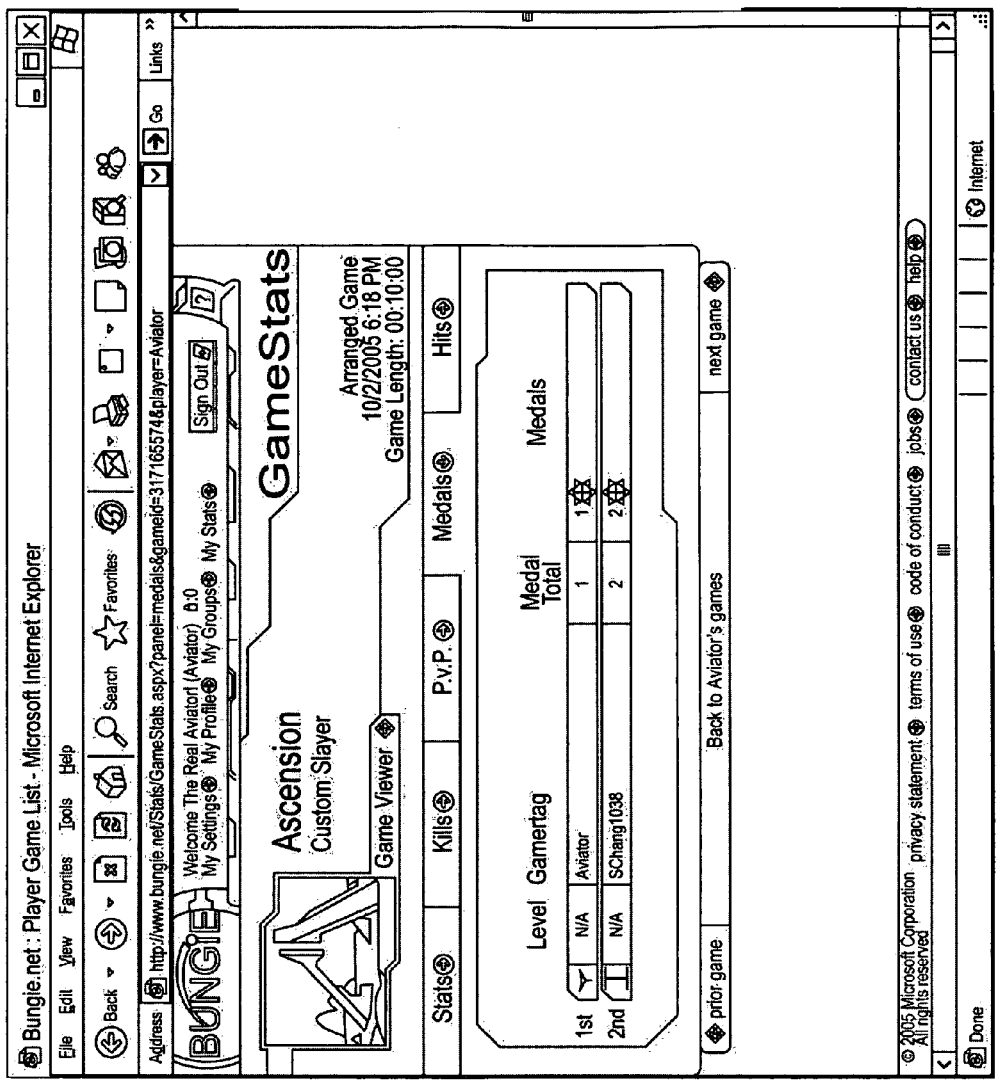
FIG. 15 illustrates a screenshot of a Medals tab of a GameStats screen according to an illustrative aspect.
Figure 16:
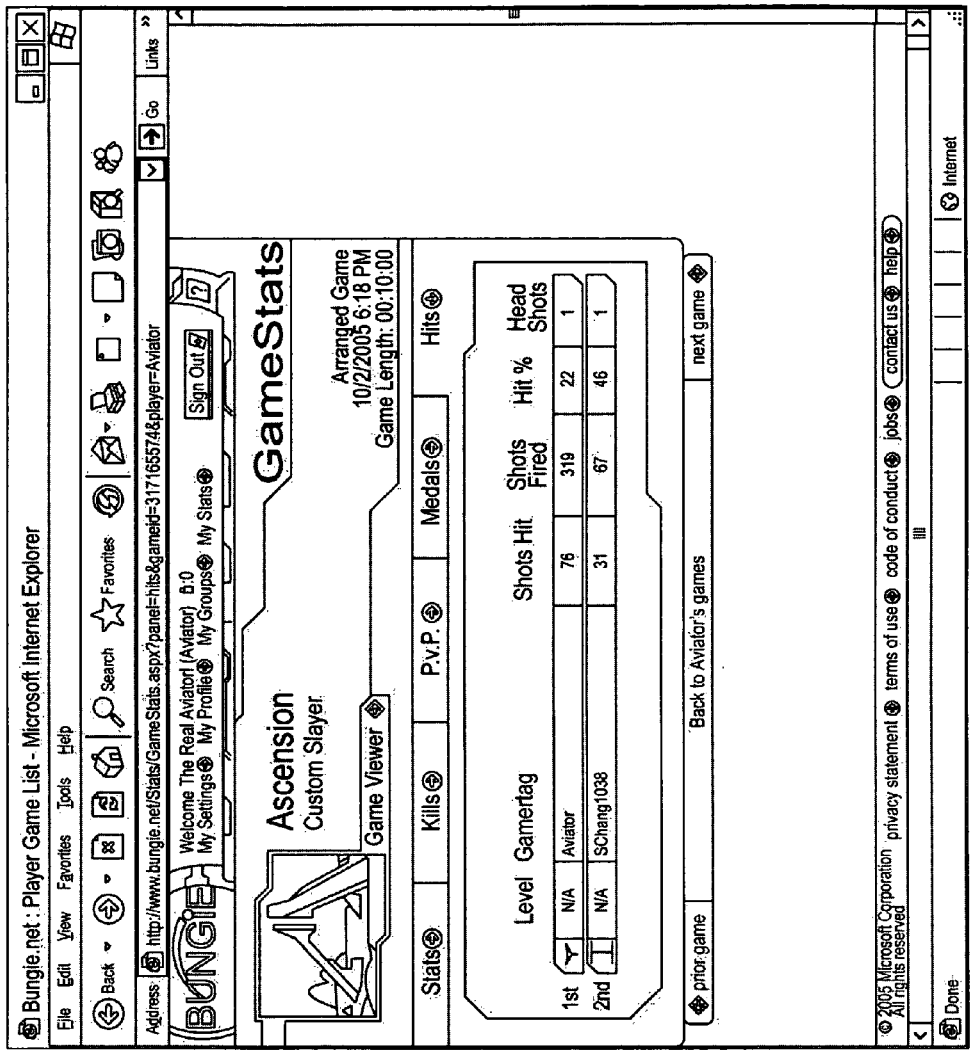
FIG. 16 illustrates a screenshot of a Hits tab of a GameStats screen according to an illustrative aspect.

Upon selecting a specific game session, e.g., game 1105, the web server 609 may serve a GameStats screen 1201 as illustrated in FIG. 12, through which the user can navigate to review post-game statistics from the post-game carnage report (PCR). GameStats screen 1201 may provide multiple tabs 1203, 1205, 1207, 1209, and 1211 through which a user can review overall stats, kills, player versus player information, medals (achievements), and hits, respectively. FIG. 12 illustrates a GameStats screen when Stats tab 1203 is selected by the user, and also represents an optional default view when the GameStats screen is selected. FIG. 13 illustrates a GameStats screen when Kills tab 1205 is selected by the user. FIG. 14 illustrates a GameStats screen when P.v.P (player versus player) tab 1207 is selected by the user. FIG. 15 illustrates a GameStats screen when Medals (achievements) tab 1209 is selected by the user. FIG. 16 illustrates a GameStats screen when Hits tab 1211 is selected by the user.

Figure 11:
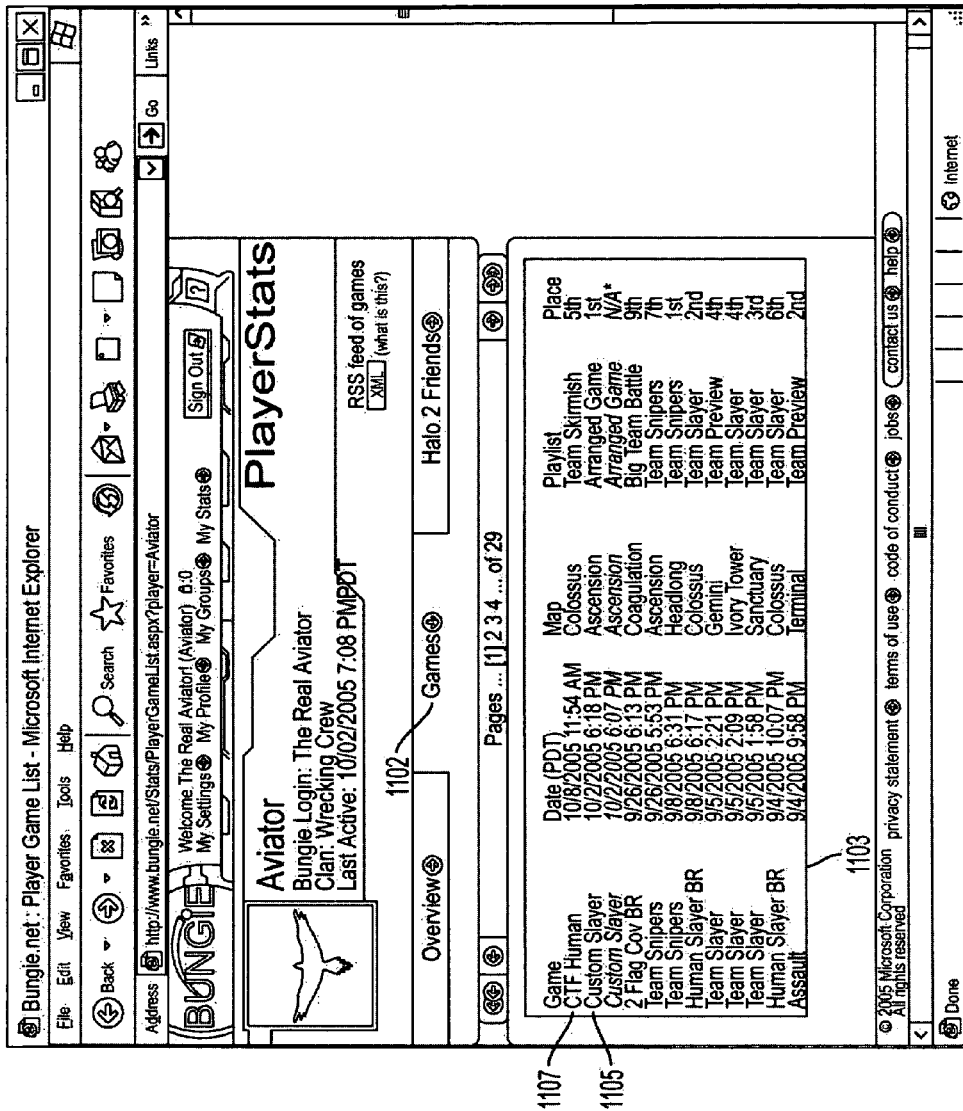
FIG. 11 illustrates a screenshot of a PlayerStats screen.
Figure 17:
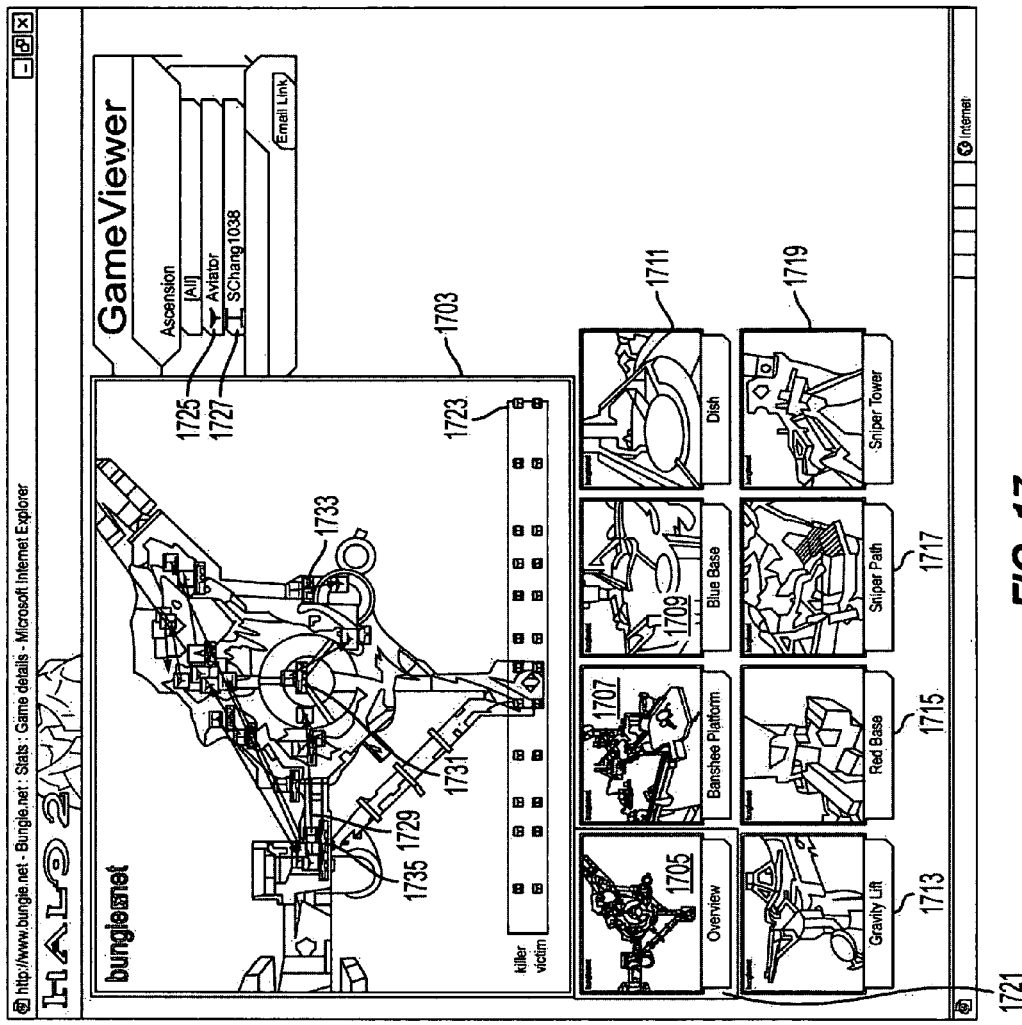
FIG. 17 illustrates a screenshot of an overhead view in a GameViewer screen according to an illustrative aspect.

Referring back to FIG. 12, GameStats screen 1201 may include a link to a GameViewer 1213, through which the user can access the recorded game data stored in database server 611. Upon selection of GameViewer link 1213, web server 609 sends a query request to database server 611 for the default view for the game session corresponding to game 1105 (FIG. 11). Database server 611 pulls the stored two-dimensional image of the default view (from step 1007, above), performs steps 1011 and 1013 of the method of FIG. 10, and sends the composite image to web server 609. With reference to FIG. 17, web server 609 then displays GameViewer screen 1701, which includes the composite image 1703. Composite image 1703 depicts an overhead overview of the HALO® 2 map entitled "Ascension." Composite image 1703 provides strategic information to the user, including a timeline 1723 of the game session indicating position and movement information, and information indicating which players killed which other players and a relative time into the game of the kill. Timeline 1723 may include various identifications of killers and victims, e.g., including a shield corresponding to each player in the appropriate location (i.e., killer or victim) at each occurrence. For example, shield 1725 may correspond to the player having the gamertag "Aviator," and a second shield 1727 may correspond to the player having the gamertag "SChang1038."

Composite image 1703 may also provide information regarding locations of each kill, as well as the weapon used for the kill. In composite image 1703, each arrow represents a kill. Each arrow originates from a shield image corresponding to a killer player character and terminates at a shield image corresponding to a victim player character. The composite image 1703 may further include a weapon icon 1731 indicating a weapon used by the killer to kill the victim. For example, weapon icon 1731 indicates a rocket launcher, weapon icon 1733 indicates a machine gun, and weapon icon 1735 indicates a sniper rifle. Other weapon icons may be used to indicate other weapons. Thus, for example, arrow 1729 indicates that, using the sniper rifle from the red base, SChang1038 killed Aviator, who was located in the dish when killed.

GameViewer screen 1701 may also include one or more icons 1705, 1707, 1709, 1711, 1713, 1715, 1717, and 1719, each corresponding to another viewpoint or perspective from which the user can review and analyze the recorded game data. Each icon may include a graphical depiction of the viewpoint and/or a name of the location the viewpoint represents or views. A presently selected view may be highlighted 1721. Upon selection of any icon, web server 609 sends a query request to database server 611 for the selected view for the game session. Database server 611 pulls the stored two-dimensional image of the selected view (from step 1007, above), performs steps 1011 and 1013 of the method of FIG. 10, and sends the composited image to web server 609. For example, upon selection of icon 1705, GameViewer screen 1701 is displayed. Upon selection of icon 1707, web server 609 displays a second GameViewer screen 1801 (FIG. 18).

Figure 18:
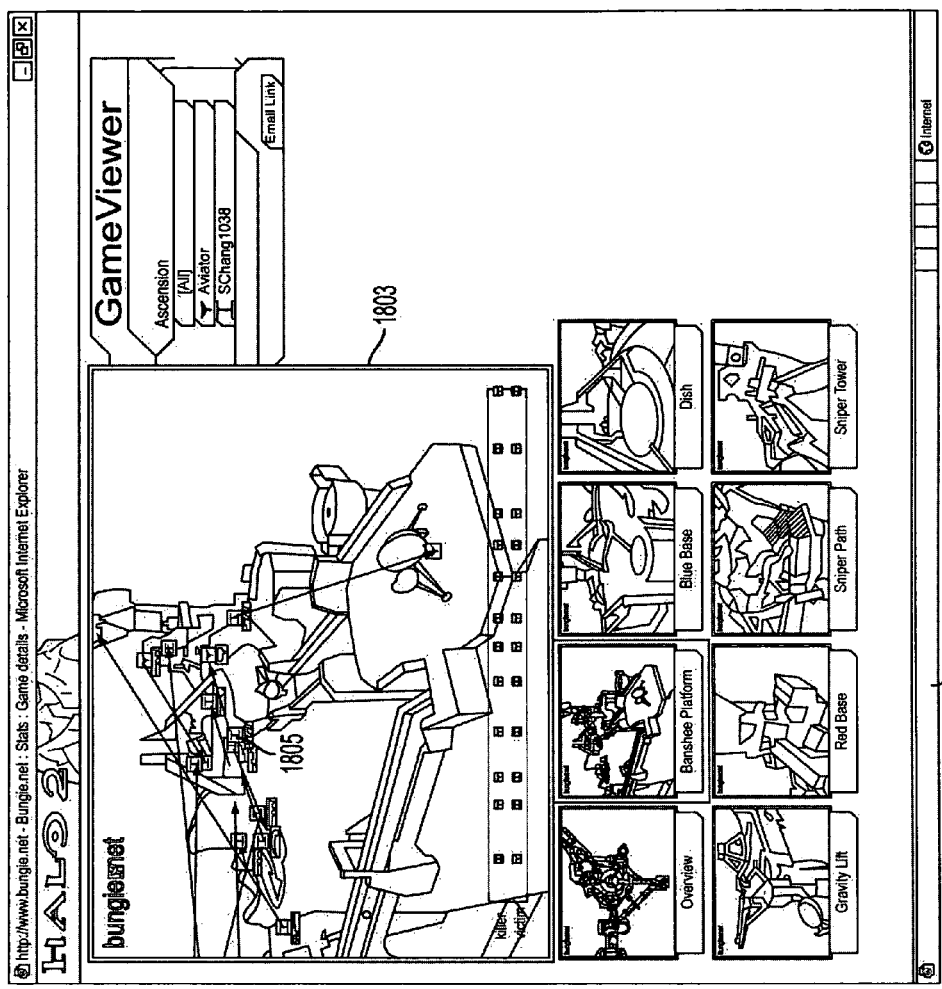
FIG. 18 illustrates a screenshot of a selected view in a GameViewer screen according to an illustrative aspect.
Figure 19:
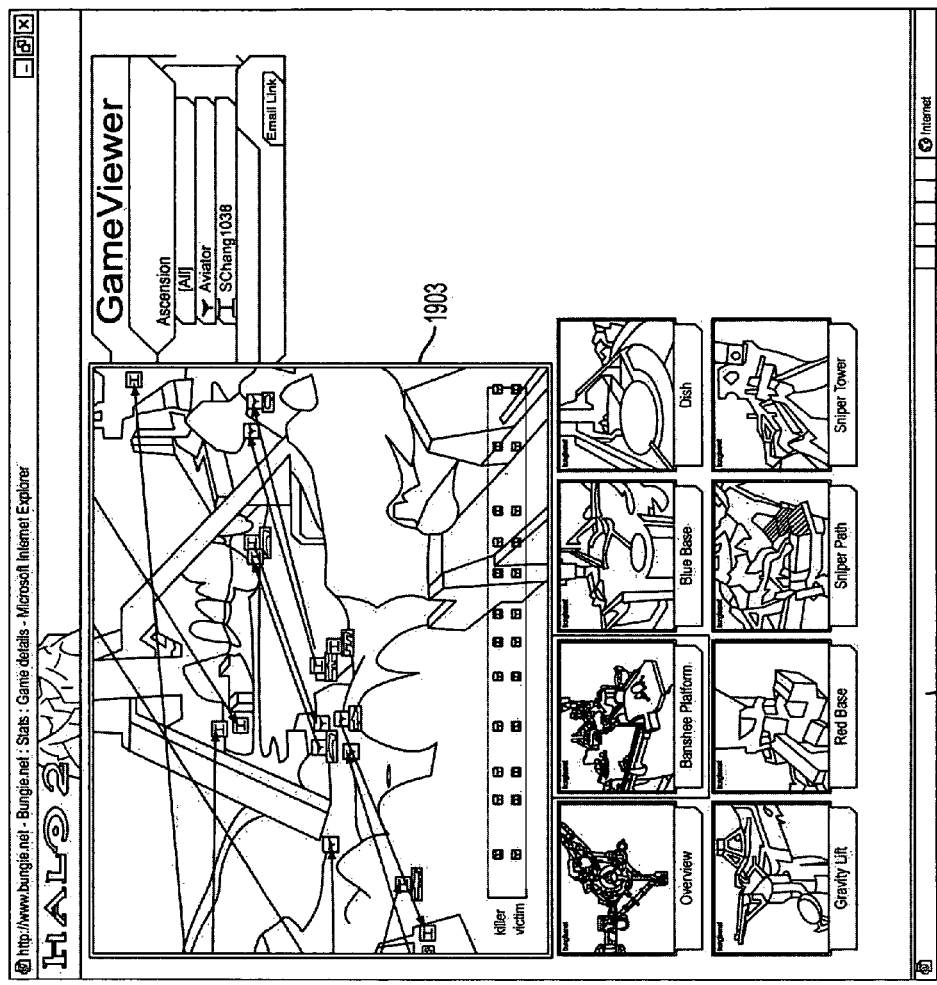
FIG. 19 illustrates a screenshot of an enlarged portion of the selected view displayed in FIG. 18.

FIG. 18 illustrates GameViewer screen 1801, which includes a composite image 1803 depicting a view from the Banshee Platform in the map entitled "Ascension." A user can enlarge a portion of the composite image by selecting a location on the image. For example, if the user selects location 1805 on composite image 1803, web server 609 displays GameViewer screen 1901 (FIG. 19), which includes composite image 1903. Composite image 1903 is an enlarged view of composite image 1803, centered on location 1805.

Figure 20:
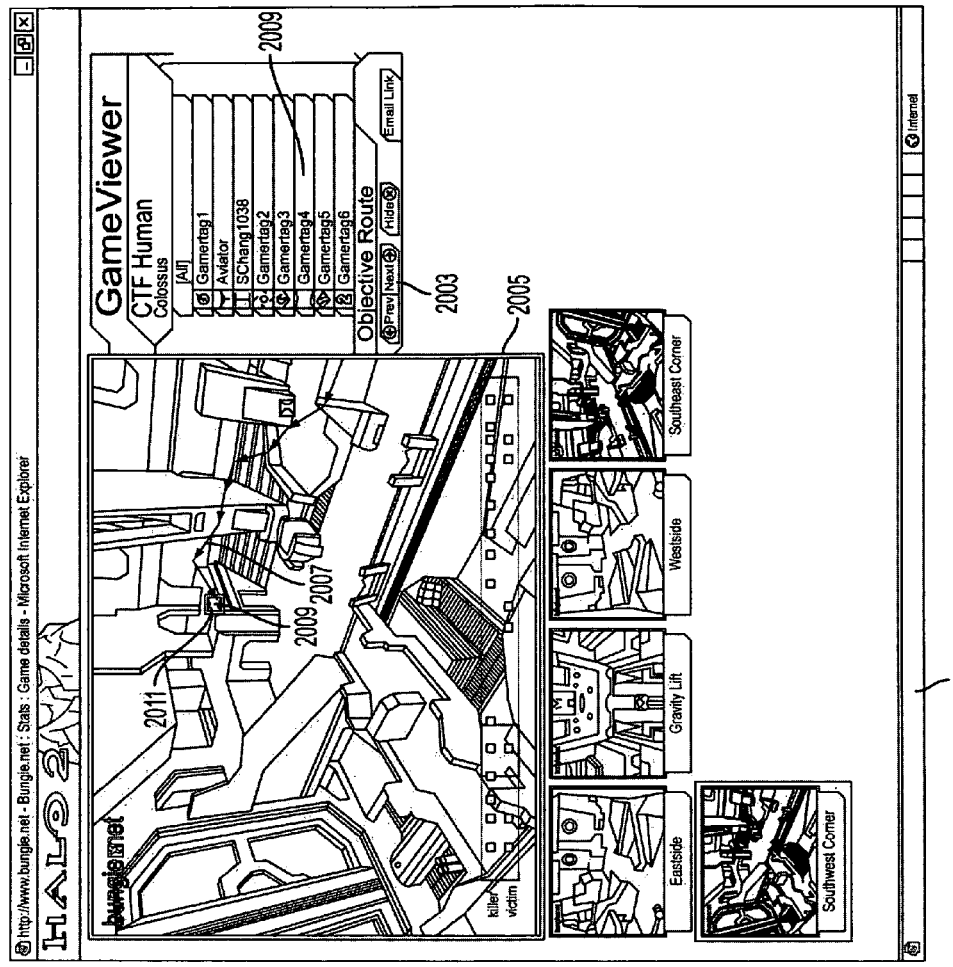
FIG. 20 illustrates a screenshot of a view in a GameViewer screen according to an illustrative aspect.

As discussed above, the recorded game information may include location information regarding paths that players took to complete an objective in some multiplayer games. FIG. 20 illustrates a gameviewer screen 2001 corresponding to game 1107 on screen 1101 (FIG. 11). As seen in FIG. 20, upon selecting an Objective Route link 2003, web server requests from database server 611 and displays composite image 2005. Composite image 2005 depicts a view from the southwest corner of a map entitled "Colossus." Composite image 2005 depicts a path 2007 over which a player 2009 carried the flag and successfully returned the flag to her home base at location 2011.

The above description of various illustrative features and aspects of a post-game GameViewer are illustrative, and various modifications and variations are possible. For example, according to one variation, database server 611 may store and index kill information by gamertag (player ID), instead of or in addition to indexing by game session. A user, via web server 609, may request a composite view of a map, e.g., Ascension, using kill data for a single gamertag, e.g., Aviator.

The database server 611 may then obtain all kill information (kills and deaths) for the selected player, and place the kill locations on a background composite image (e.g., the default overview overhead image), and serve the composite image to the web server 609 for display to the user. The composite image may thus provide an indication of locations in which Aviator was killed most often, as well as locations from which Aviator had the most kills. Instead of a timeline, the composite image may optionally provide a summary of weapons used for each kill and death. The user having gamertag Aviator may analyze the data to determine how to modify his own game play so as to avoid falling into a predictable pattern. Other users may request and analyze Aviator's data to research Aviator's style of play and determine his movement patterns and habits, e.g., always sniping from the highest location on a map.

In another variation, database server 611 may store and index information by map. A user, via web server 609, may request a composite view of a map, e.g., Ascension, for some pre- or user-defined set of players. The database server 611 may then obtain all kill information (kills and deaths) for the selected players and map, and place the kill locations on a background composite image (e.g., the default overview overhead image), and serve the composite image to the web server 609 for display to the user. For example, a user might request a composite image based on all players who have ever played a particular map, thus obtaining a composite image providing overall strategic analysis for the map based on general user trends. The user can thus learn how best to play the map when playing against a random assortment of other gamers.

Alternatively, a user could request a composite image based on all players within a predefined group, team, club, clan, or other allied group of users. Groups, clubs, teams, clans, and the like are known in the art and need not be discussed separately at length here. Thus, if a player in a clan has an upcoming match against another clan, that player can request a composite image based on the opponent clan's members, selecting a map on which the upcoming match might be played. The player can then analyze which locations the opponent clan's members hide, wait, and avoid. As a result of the pre-game analysis, the player and his or her clan may alter their strategy based on the expected strategy of the opponent clan.

In another illustrative variation, where the game session telemetry data includes a saved film (FIG. 8B), database server 611 may recreate the multiplayer game using a game engine application also stored on the database server 611 or on some other connected device, and output the game to a virtual video output port through which an MPEG, AVI, MOV or other multimedia and/or movie file may be captured based on the output. The game engine may maintain a constant camera position and angle, or rotate through a series of preset camera positions and angles to highlight various areas. The multimedia file is sent to web server 609 for further distribution to a requesting user, whereby the user can review the generated movie of the game session. Alternatively, the saved film can be converted into XML X3D and/or Virtual Reality Modeling Language (VRML) data, the standards for which are publicly known at www.web3d.org. A user can then navigate, or "fly," around the virtually depicted environment via a web page served by web server 609.

In yet another illustrative variation, instead of the user only being able to select from a predetermined set of views (e.g., view 1705-1719 of FIG. 17), the user can place a camera in any position and angle in a map, send the camera placement information to the database server 611, and the database server 611 compiles a composite image based on the user-defined camera location and angle, e.g., using a game engine to render the initial 2D view, then add the location information as described above.

Thus, using the above-described game data collection, reporting, and viewer, users can review and analyze game data and strategy after a game has ended. Users are able to review their own strategy as well as strategies used by other players. In addition, the above described system and methods can be used to detect cheating on an online gaming network. Database server 611, or some other server, may analyze the recorded data, including the flag and bomb carrying data, and compare the data against the coded laws of physics in the game engine to determine whether the movements are valid. That is, the video game might adhere to laws of physics similar to those known to exist in reality, or the video game might adhere to different physics, e.g., different gravity, acceleration, thrust, force, etc. Thus, if a player carrying the flag moves halfway across a map in one second, and the database server knows, based on the physics of the game engine, that a player cannot move that far in one second, the database server may determine that the player carrying the flag is cheating. The database server 611 may notify the online gaming network of the player's cheater status for further action against the user.

The database server 611 may also notify a matching server within the title server, thus preventing the user from being matched into multiplayer games for that game title. The database server 611 may also notify web server 609 of the player's cheater status. If a user having a gamertag identified as a cheater tries to log into the web site served by web server 609, the web server may store a cookie on that player's PC 615, identifying the owner of that PC as a cheater. The web server may then prevent any user from logging in to the web site via that PC. If the user tries to log in under a different name, the web server 609 will still detect the cookie, and continue to prevent the user from accessing the web site, regardless of the login name the user attempts to use.

Illustrative aspects may be applied to both single-player and/or multi-player games. For example, a player may use the GameViewer to analyze problem locations for that player in a single-player mode of a game, to identify where enemies are hiding or from where enemies are killing the single player. Those of skill in the art will appreciate that various inputs, functions, modules, procedures, servers, and/or other mechanisms may be used to perform features described herein. The present application includes any novel feature or combination of features disclosed herein either explicitly or any generalization thereof. While the features have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. In a computing network which includes one or more game consoles connectable to a secure private network on which players of an online video game can log on for purposes of playing the online video game and competing with one another, one or more computer-readable media storing computer-executable instructions for performing a method for collecting player telemetry data while the game is played and for analyzing the telemetry data recorded during a game session so that less skilled players have an opportunity to research tactics of more advanced players, wherein said video game comprises a simulated environment in which the game is played, and said telemetry data comprises location information corresponding to one or more events occurring within the simulated environment, and wherein said method is comprised of steps for:
   at one or more of the player consoles, recording game session telemetry data by either
      recording at least timestamp and location data for one or more predefined events which occur while the video game is being played, or
      recording player inputs and periodically recording checkpoints which include all video game state data at the instant of each checkpoint;
   once the video game is completed, automatically uploading to the secure private network the recorded game session telemetry data from the one or more player consoles at which the telemetry data was recorded, said game session telemetry data corresponding to at least a first player-character controlled by one of the players using one of said player consoles during the game session;
   at the secure network, analyzing the game session telemetry data received from all player consoles at the conclusion of the game session so as to combine the game session telemetry data from each game console into a single game session file and so as to remove redundant telemetry data where possible;
   storing the analyzed game session telemetry data in a database at the secure private network;
   at least one of the players of the game session sending to the secure private network a query regarding how a particular feat by one of the other players was accomplished, and said private network thereafter querying the database for telemetry data matching the query; and
   the private network generating a two dimensional image comprising a first view of the simulated environment overlaid with the queried telemetry data, wherein the overlaid telemetry data is placed in the two dimensional image at an approximate location of each event to which the overlaid telemetry data corresponds so that the query can be viewed and analyzed by the player submitting the query.

2. In a computing network which includes one or more game consoles connectable to a secure private network on which players of an online video game can log on for purposes of playing the online video game and competing with one another, a method for collecting player telemetry data while the game is played and for analyzing the telemetry data recorded during a game session so that less skilled players have an opportunity to research tactics of more advanced players, wherein said video game comprises a simulated environment in which the game is played, and said telemetry data comprises location information corresponding to one or more events occurring within the simulated environment, and wherein said method is comprised of steps for:
   at one or more of the player consoles, recording game session telemetry data by either
      recording at least timestamp and location data for one or more predefined events which occur while the video game is being played, or
      recording player inputs and periodically recording checkpoints which include all video game state data at the instant of each checkpoint;
   once the video game is completed, automatically uploading to the secure private network the recorded game session telemetry data from the one or more player consoles at which the telemetry data was recorded, said game session telemetry data corresponding to at least a first player-character controlled by one of the players using one of said player consoles during the game session;

at the secure network, analyzing the game session telemetry data received from all player consoles at the conclusion of the game session so as to combine the game session telemetry data from each game console into a single game session file and so as to remove redundant telemetry data where possible;

storing the analyzed game session telemetry data in a database at the secure private network;

at least one of the players of the game session sending to the secure private network a query regarding how a particular feat by one of the other players was accomplished, and said private network thereafter querying the database for telemetry data matching the query; and the private network generating a two dimensional image comprising a first view of the simulated environment overlaid with the queried telemetry data, wherein the overlaid telemetry data is placed in the two dimensional image at an approximate location of each event to which the overlaid telemetry data corresponds so that the query can be viewed and analyzed by the player submitting the query.

3. A method as defined in claims 1 or 2 wherein the one or more predefined events comprises a first player character killing a second character in the simulated environment of the video game, and wherein the overlaid telemetry data indicates an identity of a killer and an identity of a victim.

4. A method as defined in claim 3, wherein the game session telemetry data further comprises a weapon used by the first player character to kill the second character, and wherein the overlaid telemetry data further comprises an indication of the weapon used.

5. A method as defined in claim 3, wherein the second character compnses a second player character.

6. A method as defined in claims 1 or 2 wherein the query comprises a map.

7. A method as defined in claims 1 or 2 wherein the query comprises an identification of an allied group of users.

8. A method as defined in claims 1 or 2 wherein the one or more predefined events comprises the player character carrying an object usable in the video game to complete an objective.

9. The method of claim 8, wherein the telemetry data comprises a location of the player character, determined at least once for a predetermined amount of time, while the player character is carrying the object usable in the video game to complete the objective.

10. A method as defined in claims 1 or 2 wherein the game session telemetry data corresponds to a player-character, said player-character controlled by a user of a game console, and said game session telemetry data comprising location information over time, each location corresponding to one or more events occurring during the game session.

11. A method as defined in claim 10 further comprising steps for comparing the stored game session telemetry data against the physics of a game engine of the video game; and determining that a user corresponding to the telemetry data is a cheater when the stored game session telemetry data is adverse to the physics of the game engine.

12. A method as defined in claim 10 wherein the game session telemetry data comprises location information over time as the player character carries an object usable in the video game to complete an objective.

13. A method as defined in 11 further comprising steps for detecting when the user is attempting to log in to a web server; and when the user has been determined to be a cheater, causing a cookie indicating a cheater status to be stored on a computer corresponding to the user.

14. A method as defined in claim 13 further comprising steps for checking for the presence of the cookie on a computer attempting to log in to the web site; and when the cookie is present, preventing anyone from logging in to the web site from the computer on which the cookie is stored.

* * * * *